(No Model.)
W. CARRICK.
MANICURE IMPLEMENT.
No. 562,573. Patented June 23, 1896.
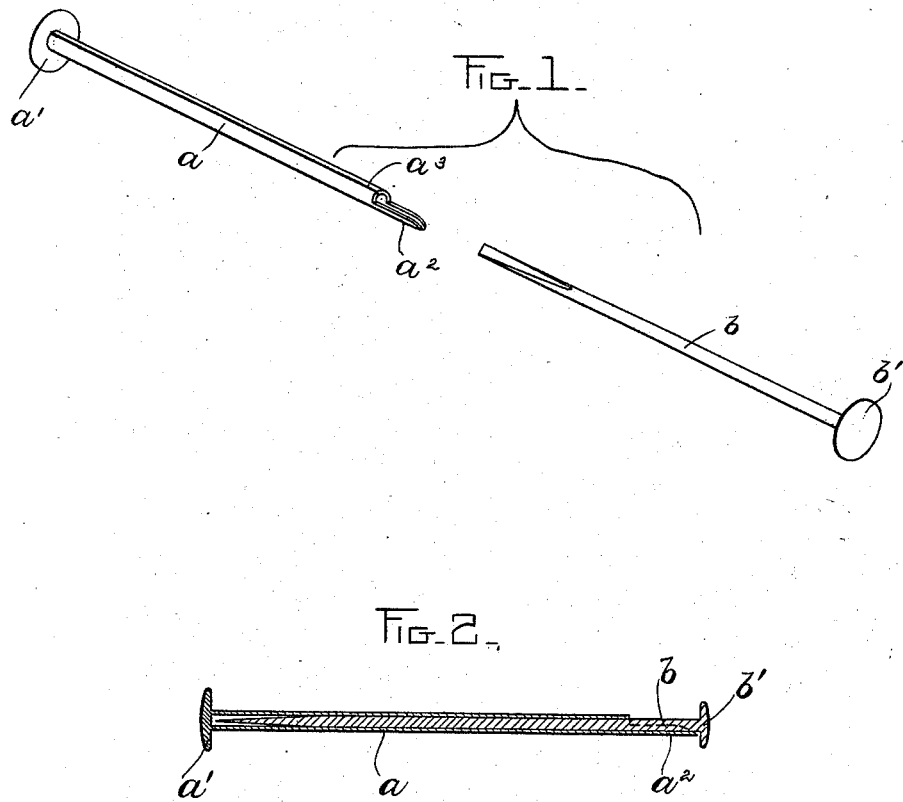
Witnesses:
A. D. Harrison.
A. G. Adams.
Inventor:
W. Carrick
by Knight Brown & Quinby
Attys.

UNITED STATES PATENT OFFICE.

WILLIAM CARRICK, OF BOSTON, MASSACHUSETTS.

MANICURE IMPLEMENT.

SPECIFICATION forming part of Letters Patent No. 562,573, dated June 23, 1896.

Application filed April 10, 1896. Serial No. 586,917. (No model.)

*To all whom it may concern:*

Be it known that I, WILLIAM CARRICK, of Boston, in the county of Suffolk and State of Massachusetts, have invented certain new and useful Improvements in Manicure Implements, of which the following is a specification.

This invention has for its object to provide a simple and convenient manicure implement, adapted to be carried in the pocket, and to be used for various purposes, such as cleaning the ears and nails.

The invention consists in the improvements which I will now proceed to describe and claim.

Of the accompanying drawings, forming a part of this specification, Figure 1 represents in separate views the parts of my improved implement disconnected. Fig. 2 represents a sectional view showing the parts together.

In the drawings, $a$ represents a tubular shank, upon one end of which is formed a circular or disk-shaped head $a'$. The said head is made of suitable size to be conveniently inserted in the human ear, and while comparatively thin is carefully finished and polished around its margin, to avoid any roughness and prevent any liability of scratching the surfaces on which it acts, the object being to enable the disk to thoroughly clean the ear without injuring it. The opposite end of the shank $a$ is cut away at one side to form a nail scraping or cleaning projection $a^2$.

$b$ represents a smaller shank, adapted to be inserted in the tubular shank $a$ and provided at one end with a disk or head $b'$, which is formed like the head $a'$, but is preferably of a different diameter. The opposite end of the shank $b$ is reduced to a thin flat tip, being thus formed to serve as a toothpick, or it may be adapted for any other desired purpose.

It will be seen that when one shank is inserted in the other, as shown in Fig. 2, the disks or heads are located at opposite ends of the device, and can be used for the purposes for which they are intended, the difference in the sizes of the two heads giving the operator a choice between two sizes. When carried in the pocket, the heads prevent any liability of the device penetrating the material of the pocket. When the parts are separated, each is capable of being used for the various purposes for which it is intended, the tubular shank $a$ forming a convenient sheath for the smaller shank $b$ when the latter is not required for use.

The shank $a$ may be split longitudinally, as indicated at $a^3$, which will make it somewhat yielding and enable it to hug the shank $b$ and prevent the latter from slipping out accidentally.

I claim—

A manicure implement comprising a tubular shank having at one end a circular head or disk, its other end being open, and a smaller solid shank formed to enter the tubular shank and having a circular disk or head at one end, and a thin flat tip at the other end, the two disks being of different diameters.

In testimony whereof I have signed my name to this specification, in the presence of two subscribing witnesses, this 8th day of April, A. D. 1896.

W. CARRICK.

Witnesses:
C. F. BROWN,
A. D. HARRISON.